United States Patent
Tian et al.

(10) Patent No.: US 11,348,191 B2
(45) Date of Patent: May 31, 2022

(54) SYSTEM AND METHOD FOR VEHICLE REPORTING ELECTRICAL INFRASTRUCTURE AND VEGETATION TWINING

(71) Applicant: Honda Motor Co., Ltd., Tokyo (JP)

(72) Inventors: Danyang Tian, Ann Arbor, MI (US); Xue Bai, Novi, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 16/836,206

(22) Filed: Mar. 31, 2020

(65) Prior Publication Data

US 2021/0304327 A1    Sep. 30, 2021

(51) Int. Cl.
*G06Q 50/00* (2012.01)
*G06Q 50/06* (2012.01)
*G06Q 10/06* (2012.01)

(52) U.S. Cl.
CPC .......... *G06Q 50/06* (2013.01); *G06Q 10/063* (2013.01)

(58) Field of Classification Search
CPC .............................. G06Q 50/06; G06Q 10/063
See application file for complete search history.

(56) References Cited

U.S. PATENT DOCUMENTS

| | | |
|---|---|---|
| 8,504,431 B2 | 8/2013 | Huang et al. |
| 9,048,639 B2 | 6/2015 | Hyde et al. |
| 9,557,720 B1 | 1/2017 | Woods et al. |
| 9,705,571 B2* | 7/2017 | Gerszberg ................ H04B 3/54 |
| 9,784,836 B2 | 10/2017 | Heinonen et al. |
| 10,346,687 B2* | 7/2019 | Pestun ............... G06K 9/00651 |
| 2005/0007450 A1 | 1/2005 | Hill et al. |
| 2012/0169498 A1* | 7/2012 | Leppanen .......... G06K 9/00657 340/540 |

(Continued)

FOREIGN PATENT DOCUMENTS

| | | |
|---|---|---|
| WO | 2002/082181 | 10/2002 |
| WO | 2005/043347 | 5/2005 |

(Continued)

OTHER PUBLICATIONS

Brian Kurinsky, Power Line Corridor Vegetation Management: Clearing a Path to Reliable Electric Service Using LiDAR, Oct. 2013, pp. 1-117, Maryville, Missouri, USA.

(Continued)

*Primary Examiner* — Pakee Fang
(74) *Attorney, Agent, or Firm* — Rankin, Hill & Clark LLP (57) ABSTRACT

Systems and methods for reporting electrical infrastructure and vegetation twining are provided. In one embodiment, a system for reporting electrical infrastructure and vegetation twining is provided. The system includes a recognition module, a position module, a twining module, and a report module. The recognition module is configured to detect electrical infrastructure and vegetation in a set of sensor data received from vehicle sensors. The position module is configured to associate a location with the set of sensor data. The twining module is configured to identify a twining event of the vegetation and the electrical infrastructure based on a proximity threshold of the electrical infrastructure and the vegetation. The report module is configured to generate a report including the twining event and the location.

20 Claims, 5 Drawing Sheets

(56) References Cited

U.S. PATENT DOCUMENTS

2017/0052222 A1* 2/2017 Pasdar .................. H02H 1/003
2018/0098137 A1* 4/2018 Saha ..................... G06K 9/0063
2021/0073692 A1* 3/2021 Saha ........................ G06N 3/08

FOREIGN PATENT DOCUMENTS

| WO | 2010095918 | 8/2010 |
| WO | 2013/148776 | 10/2013 |
| WO | 2013/148782 | 10/2013 |
| WO | 2013/157920 | 10/2013 |
| WO | 2016/198873 | 12/2016 |

OTHER PUBLICATIONS

Zhengrong Li, et al., Advances in Vegetation Management for Power Line Corridor Monitoring Using Aerial Remote Sensing Techniques, 2010 1st International Conference on Applied Robotics for the Power Industry Delta Center-Ville, Oct. 5-7, 2010, pp. 1-6, Montreal, Canada.

English Abstract and English translation of Indian Patent No. IN4373CH2015A issued Sep. 4, 2015 titled "Overhead Transmission Line Inspection Robotic System and Mechanism Thereof". Original document unavailable.

\* cited by examiner

SYSTEM AND METHOD FOR VEHICLE REPORTING ELECTRICAL INFRASTRUCTURE AND VEGETATION TWINING

BACKGROUND

It is estimated that approximately 20% of unplanned power outages are caused by trees and other vegetation growing too close to powerlines. As one example, in high winds, trees and their debris can be blown onto powerlines, causing the lines to short-circuit. Tree twined in powerlines may also cause significant damage to electrical equipment, resulting in power cuts. Furthermore, trees growing through, or close to, powerlines are dangerous because they create a potential path for electricity to travel to the ground. People that come into contact with this path, by touching, climbing, trimming or cutting down the trees, put themselves at serious risk of being electrocuted or receiving significant electrical burns. Additionally, trees near powerlines are also a serious fire risk in dry weather conditions, for example, trees, leaves, or branches touching lines can catch fire.

BRIEF DESCRIPTION

According to one aspect, a system for reporting electrical infrastructure and vegetation twining is provided. The system includes a recognition module, a position module, a twining module, and a report module. The recognition module is configured to detect the electrical infrastructure and the vegetation in a set of sensor data received from vehicle sensors of a vehicle. The position module is configured to associate a location with the set of sensor data. The twining module is configured to identify a twining event of the vegetation and the electrical infrastructure based on a proximity threshold of the electrical infrastructure and the vegetation. The report module is configured to generate a report including the twining event and the location.

According to another aspect, a method for reporting electrical infrastructure and vegetation twining is provided. The method includes detecting the electrical infrastructure and the vegetation in a set of sensor data received from vehicle sensors of a vehicle. The method also includes associating a location with the set of sensor data. The method further includes identifying a twining event of the vegetation and the electrical infrastructure based on a proximity threshold of the electrical infrastructure and the vegetation. The method yet further including generating a report including the twining event and the location.

According to a further aspect, a non-transitory computer readable storage medium storing instructions that when executed by a computer, which includes a processor to perform a method for reporting electrical infrastructure and vegetation twining. The method including detecting electrical infrastructure and vegetation in a set of sensor data received from vehicle sensors of a vehicle. The method also includes associating a location with the set of sensor data. The method further includes identifying a twining event of the vegetation and the electrical infrastructure based on a proximity threshold of the electrical infrastructure and the vegetation. The method yet further including generating a report including the twining event and the location.

DETAILED DESCRIPTION

Vegetation becoming entwined with electrical infrastructure can pose a threat to the electrical infrastructure, the surrounding environment, as well as humans and animals in the surrounding environment. The systems and methods described herein are directed to reporting electrical infrastructure and vegetation twining. Because electrical infrastructure typically follows roadways, vehicles traveling the roadways may receive sensor data that includes information about the electrical infrastructure. For example, the sensor data may include images from cameras of the vehicle. Accordingly, areas in which electrical infrastructure and vegetation coexist may be identified from a set of the sensor data. Furthermore, a plurality of vehicles may likewise capture sets of data that identify the areas in which electrical infrastructure and vegetation coexist. The vehicle(s) may also associate a location with the set(s) of the sensor data so that it can be determined where the set(s) of the sensor data was captured by the vehicle(s).

The set of sensor data may be used to identify a twining event when the vegetation is twined with the electrical infrastructure. A twining event occurs when vegetation may be close enough to the electrical infrastructure to cause a problem. Accordingly, the twining event may define twining of the vegetation and the electrical infrastructure as the vegetation being within a proximity threshold of the electrical infrastructure. The set of sensor data may be analyzed to determine if an encroachment distance between the vegetation and the electrical infrastructure satisfies the proximity threshold.

When a twining event is identified, the twining event may be reported to interested entities such as utility companies, governments, property owners, etc. A report may also include other information such as weather events, alternative routes, event positions, a hazard score, vegetation growing speed and/or lifetime, weather conditions (e.g., wind speed, climate, lightening, rain, etc.), and pruning tools, among others. Moreover, a cost may be estimated for the twining event. For example, the cost may be an estimate the cost to repair or trim the vegetation. Thus, twining events can be reported to interested entities from one or more vehicles, as such, twining events can be crowd sourced by vehicles traveling the roadways.

Definitions

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one or more computers and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface," as used herein can include input and/or output devices for receiving input and/or devices for outputting data. The input and/or output can be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR- RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

A "user," as used herein can include, but is not limited to, one or more biological beings. The biological being may be associated with a vehicle, for example, the user can be a driver or a passenger of a vehicle. The user may also be a corporate, commercial, or governmental entity. In one embodiment, the user may be an electrical utility company. In another embodiment, the user may be an agent of the electrical utility company.

"Value," and "level," as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle powered wholly or partially by any form of rechargeable energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle. The autonomous vehicle can carry one or more users. Further, the term "vehicle" can include vehicles that are automated or non-automated with predetermined paths or free-moving vehicles.

"Vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. Systems Overview

Figure 1:
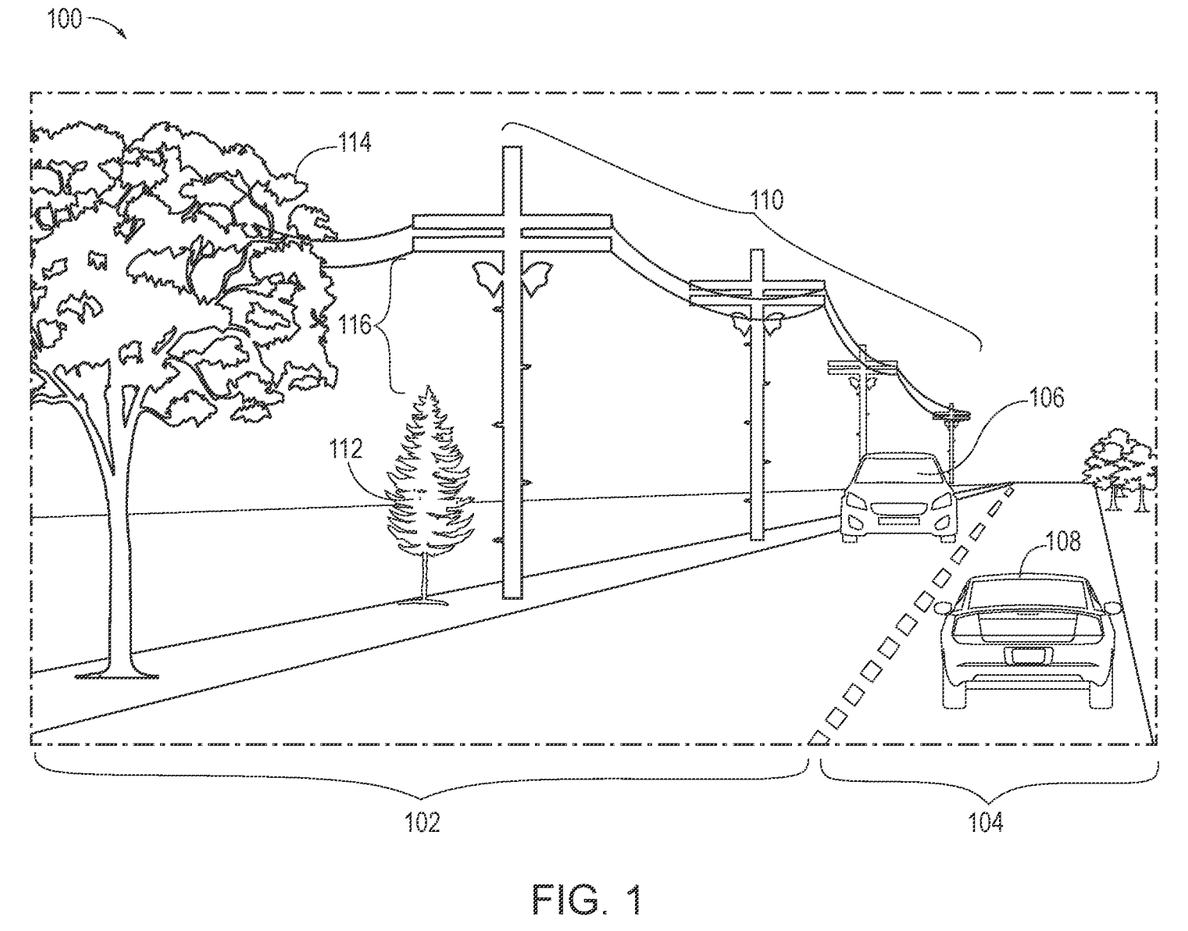
FIG. 1 is a schematic view of roadway environment having electrical infrastructure and vegetation according to one embodiment.

Referring now to the drawings, the showings are for purposes of illustrating one or more exemplary embodiments and not for purposes of limiting the same. FIG. 1 includes a roadway 100 having a first lane 102 and a second lane 104. The roadway 100 can be any type of road, highway, freeway, pathway, track, or travel route. In FIG. 1, the first lane 102 may travel in a first longitudinal direction and the second lane 104 may travel in a second longitudinal direction opposite the first longitudinal direction. It is understood that the roadway 100 can have various configurations not shown in FIG. 1, for example, the roadway 100 can have any number of lanes.

Vehicles may travel on the roadway 100. Here, a first vehicle 106 may travel in the first lane 102 and a second vehicle 108 may travel in the second lane 104. For clarity, the vehicles will be described with similar vehicle sensors, vehicle systems, and features, however the first vehicle 106 and the second vehicle 108 may have different vehicle sensors, vehicle systems, and features. In some embodiments, a user (not shown) may be present in the first vehicle 106 or the second vehicle 108. The first vehicle 106 and the second vehicle 108 may be consumer operated.

Electrical infrastructure 110 may also be present in the area surrounding the roadway 100. The electrical infrastructure 110 delivers, senses, monitors, transmits electrical current and may include an anchor portal, conductor marking light, digital protective relay, electrical substation, high frequency line trap, hybrid switchgear module, interconnector, motor control center, overhead line, overhead line crossing, power distribution center, power plant, traction current pylon, transformer, and utility pole, among others. Here, the electrical infrastructure 110 is adjacent the first lane 102. In other embodiments, the electrical infrastructure 110 may additionally or alternatively be adjacent the second lane 104. The electrical infrastructure 110 may also cross-sect the roadway 100.

Vegetation may also be present in the area surrounding the roadway 100. The vegetation may include trees, shrubs, herbs, climbing, coiling, and trailing perennial vines, among other types of plants. Here, the vegetation may be described a first tree 112 and a second tree 114. While described as trees for simplicity, the first tree 112 and the second tree 114 may be any type of vegetation. The vegetation may encroach on the electrical infrastructure 110 such that the distance between the vegetation and the electrical infrastructure 110 may be an encroachment distance. For example, the first tree 112 may come within a first encroachment distance 116 of the electrical infrastructure. In an embodiment, in which the vegetation is already entwined with the electrical infrastructure 110, the encroachment distance may be a null encroachment distance. For example, because at least a portion of the second tree 114 is in contact with at least a portion of the electrical infrastructure 110, the encroachment distance between the electrical infrastructure 110 and the second tree 114 is the null encroachment distance.

The first vehicle 106 and/or the second vehicle 108 may have vehicle systems and/or vehicle sensors that can identify electrical infrastructure 110 and vegetation twining. The first vehicle 106 and/or the second vehicle 108 may access an operating environment 200, shown in FIG. 2, to provide sensor data and/or report electrical infrastructure 110 and vegetation twining.

Figure 2:
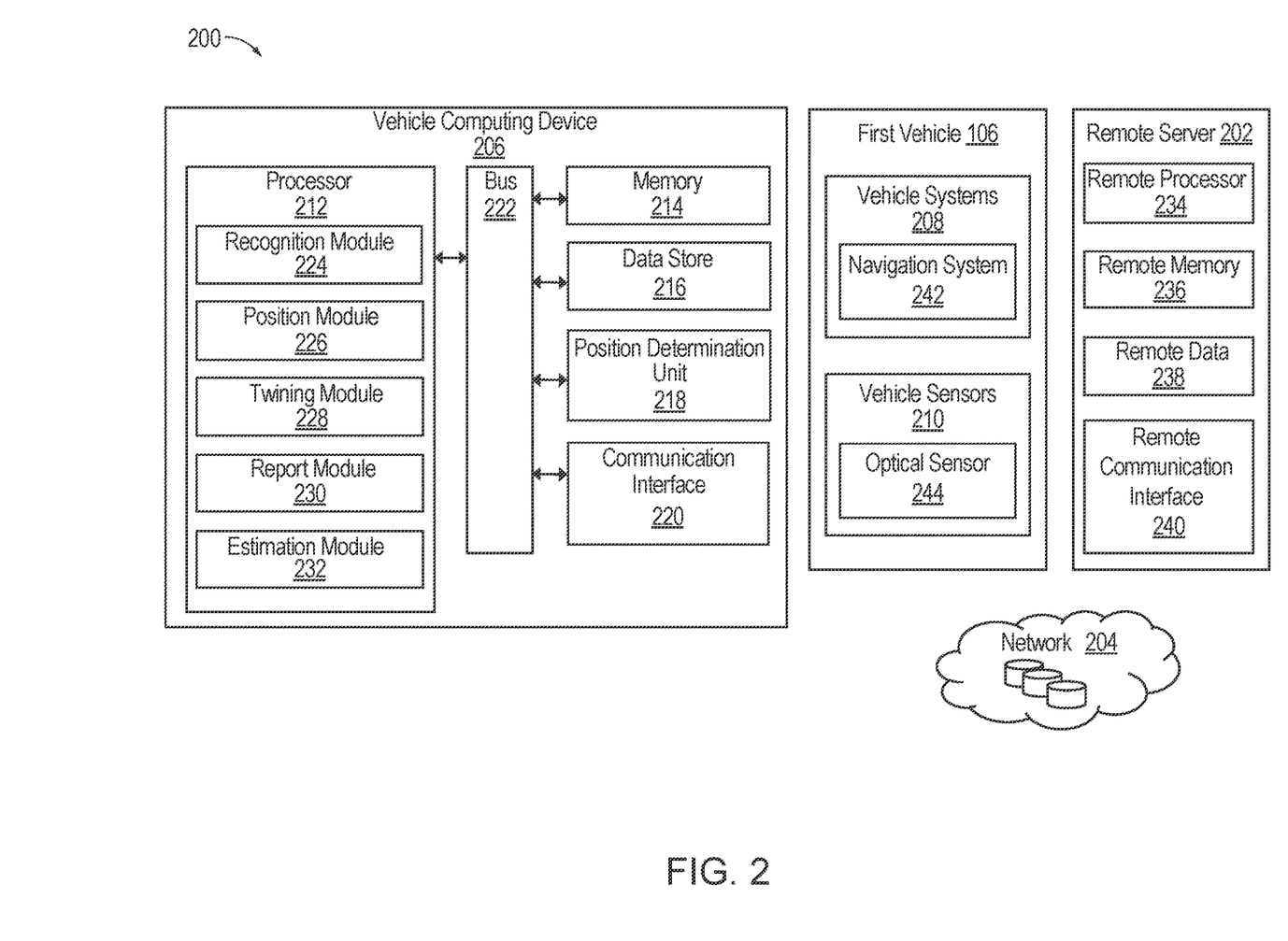
FIG. 2 is a block diagram of an operating environment for reporting electrical infrastructure and vegetation twining according to an exemplary embodiment.

FIG. 2, a block diagram of the operating environment 200 for reporting electrical infrastructure and vegetation twining according to an exemplary embodiment. One or more of the components of the operating environment 200 can be considered in whole or in part a vehicle communication network. One or more of the components of the operating environment 200 can be considered in whole or in part a vehicle communication network. The first vehicle 106 and/or the second vehicle 108 may communicate with a remote server 202 over a network 204. A vehicle computing device (VCD) 206 may be provided at the first vehicle 106 and/or the second vehicle 108, the remote server 202, or other remote location operably connected to the first vehicle 106, the second vehicle 108, and/or the remote server 202 via the network 204. Vehicle systems 208 and vehicle sensors 210 communicate information about the first vehicle 106, the second vehicle 108, and/or the surrounding area, including objects like vegetation and the electrical infrastructure 110 in the surrounding area, to the VCD 206.

Generally, the VCD 206 includes a processor 212, a memory 214, a data store 216, a position determination unit 218, and a communication interface 220, which are each operably connected for computer communication via a bus 222 and/or other wired and wireless technologies defined herein. The VCD 206, can include provisions for processing, communicating, and interacting with various components of the first vehicle 106 and other components of the operating environment 200. In one embodiment, the VCD 206 can be implemented with the first vehicle 106 and/or the second vehicle 108, for example, as part of a telematics unit, a head unit, an infotainment unit, an electronic control unit, an on-board unit, or as part of a specific vehicle control system, among others. In other embodiments, the VCD 206 can be implemented remotely from the first vehicle 106 and/or the second vehicle 108, for example, with a portable device or the remote server 202, connected via the network 204.

The processor 212 can include logic circuitry with hardware, firmware, and software architecture frameworks. Thus, in some embodiments, the processor 212 can store application frameworks, kernels, libraries, drivers, application program interfaces, among others, to execute and control hardware and functions discussed herein. For example, the processor 212 can include a recognition module 224, a position module 226, a twining module 228, a report module 230, and an estimation module 232 although it is understood that the processor 212 can be configured into other architectures. The memory 214 and/or the data store 216 may store data about the first vehicle 106 and/or the second vehicle 108, such as sensor data. Further, in some embodiments, the memory 214 and/or the data store 216 can store similar components as the processor 212 for execution by the processor 212.

The recognition module 224, the position module 226, and the twining module 228, the report module 230, and the estimation module 232 of the processor 212 may access the position determination unit 218 via the bus 222. The position determination unit 218 can include hardware (e.g., sensors) and software to determine and/or acquire position data about the roadway 100, first vehicle 106, the second vehicle 108, the electrical infrastructure 110, and vegetation, among others. For example, the position determination unit 218 can include a global positioning system (GPS) unit (not shown) and/or an inertial measurement unit (IMU) (not shown). Thus, the position determination unit 218 can provide a geo-position of the first vehicle 106 and/or the second vehicle 108 based on satellite data from, for example, a global position source (not shown), or from any Global Navigational Satellite infrastructure (GNSS), including GPS, Glonass (Russian) and/or Galileo (European). Further, the position determination unit 218 can provide dead-reckoning data or motion data from, for example, a gyroscope, accelerometer, magnetometers, among other vehicle sensors 210. In some embodiments, the position determination unit 218 can be a component of the navigation system 242 of the vehicle systems 208 and the location of other objects in the surrounding area, such as the first tree 112 and the second tree 114 can be extrapolated from location of the first vehicle 106 and/or the second vehicle 108.

The communication interface 220 can include software and hardware to facilitate data input and output between the components of the VCD 206 and other components of the operating environment 200. Specifically, the communication interface 220 can include network interface controllers (not shown) and other hardware and software that manages and/or monitors connections and controls bi-directional data transfer between the communication interface 220 and other components of the operating environment 200 using, for example, the network 204. More specifically, in one embodiment, the VCD 206 can exchange data and/or transmit data, such as the sensor data, with other operably connected devices or other communication hardware and protocols. Thus, the VCD 206 can exchange data with a user, utility, the first vehicle 106 and/or the second vehicle 108. In some embodiments, the first vehicle 106 and/or the second vehicle 108 can also exchange data (e.g., sets of sensor data as will be described herein) over remote networks by utilizing the network 204 (e.g., a wireless communication network), or other wireless network connections.

The remote server 202 may include a remote processor 234 that processes information and a remote memory 236 that generates and/or stores information about vegetation and/or the electrical infrastructure 110. In one embodiment, the recognition module 224 may access the remote data 238, such as the sensor data, via the remote communications interface 240. In one embodiment, the remote server 202 and/or the VCD 206 may be communicate with a utility company, government agency, service provider or other entity that receives sensor data regarding delivering, sensing, monitoring, and/or transmitting electrical current via the network 204. Accordingly, the remote server 202 and/or the VCD 206 may access, store, utilize, or transmit the sensor data regarding the vegetation or electrical infrastructure 110. Similarly, the remote server 202 and/or the VCD 206 may communicate with the electrical infrastructure 110 via the network 204.

Referring again to the first vehicle 106 and/or the second vehicle 108, the vehicle systems 208 can include any type of vehicle control system and/or vehicle described herein to enhance the operation, performance, and/or safety of the first vehicle 106 and/or the second vehicle 108. Here, the vehicle systems 208 may include a navigation system 242. The navigation system 242 stores, calculates, and provides route and destination information and facilitates features like turn-by-turn directions.

The vehicle sensors 210, which can be implemented with the vehicle systems 208, can include various types of sensors for use with the first vehicle 106 and/or the second vehicle 108 and/or the vehicle systems 208 for detecting and/or sensing a parameter of the first vehicle 106 and/or the second vehicle 108, the vehicle systems 208, and/or the environment surrounding the first vehicle 106 and/or the second vehicle 108. For example, the vehicle sensors 210 can detect and identify objects in the surrounding environment. The vehicle sensors 210 can include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. The vehicle sensors 210 can be any type of sensor, for example, acoustic, electric, environmental, imaging, light, ranging, pressure, force, moisture, thermal, temperature, proximity, among others. For example, the vehicle sensors 210 may include an optical sensor 244 for converting light information into electrical signals.

Using the system and network configuration discussed above, a twining event of vegetation and the electrical infrastructure 110 twining may be reported based on sensor data from the vehicle sensors 210. Accordingly, a user may be able to determine a location and severity of the twining event, as well as a cost to remedy the twining event. Detailed embodiments describing exemplary methods using the system and network configuration discussed above will now be discussed in detail.

II. Methods for Reporting Twining Events

Figure 3:
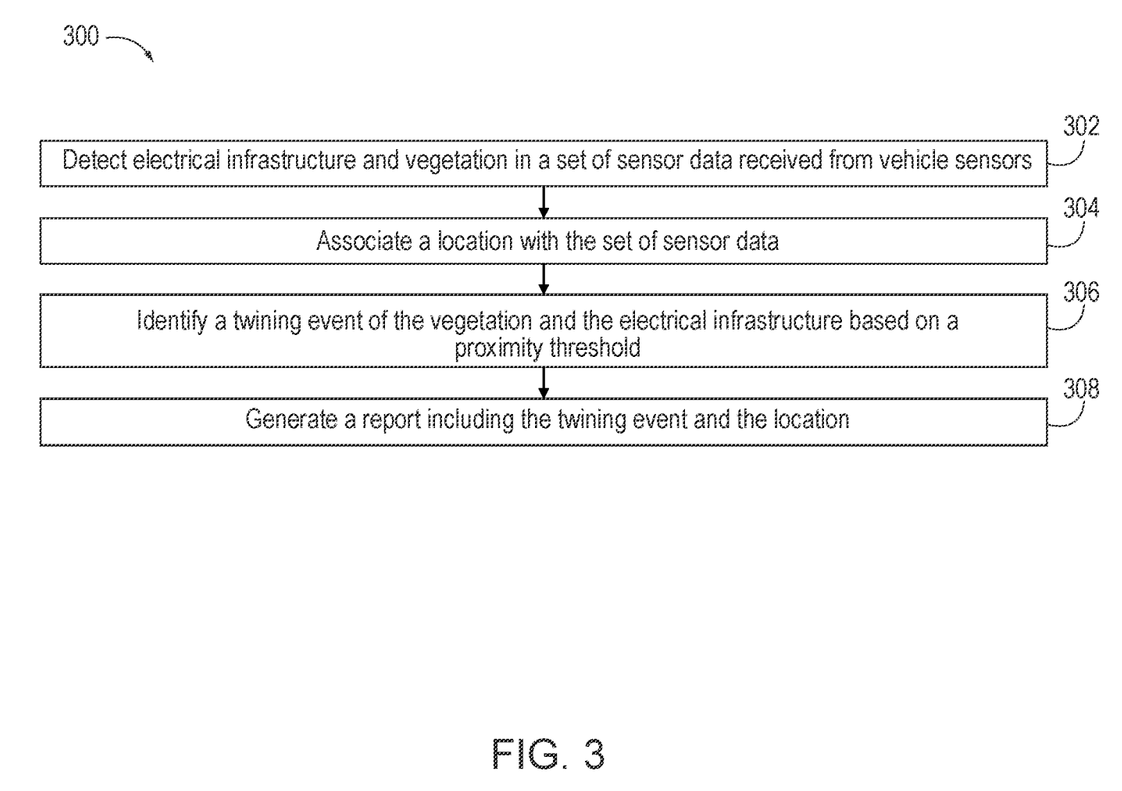
FIG. 3 is a process flow for reporting electrical infrastructure and vegetation twining according to one embodiment.

Referring now to FIG. 3, a method 300 for reporting vegetation and electrical infrastructure 110 twining is provided according to an exemplary embodiment. FIG. 3 will be described with reference to FIGS. 1 and 2. As shown in FIG. 3, the method 300 can be described by a number of steps. For simplicity, the method 300 will be described by these steps, but it is understood that the steps of the method 300 can be organized into different architectures, blocks, stages, and/or processes.

At block 302 the method 300 includes the recognition module 224 detecting electrical infrastructure 110 and vegetation in a set of sensor data received from vehicle sensors 210. Sensor data may be received from the vehicle sensors 210 of, for example, the first vehicle 106. Here, the method 300 is described with respect to the first vehicle 106, however, the second vehicle 108 may also be a party to the method 300. In some embodiments, the second vehicle 108 may perform the methods 300 in tandem with the first vehicle 106. For example, the second vehicle 108 may receive sensor data from vehicle sensors of the second vehicle 108. In one embodiment, the first vehicle 106 and/or the second vehicle 108 may be consumer operated vehicles. Accordingly, the sensor data may be received from vehicles on the roadway 100 for consumer uses (e.g., travel, commute, errands, leisure, etc.) rather than an interested party having to dedicate a fleet of vehicles to identifying twining events.

The sensor data may be image data from the optical sensor 244. The optical sensor 244 may be a camera, light detection and ranging (LIDAR) sensor, and/or radio detection and ranging (RADAR), among others. The sensor data may be received from the optical sensor 244 a series of frames. For example, the optical sensor 244 may receive sensor data as a video having a series of frames. The sensor data, such as the series of frames, may include image data of the roadway 100 and the surrounding area.

The recognition module 224 may identify objects in the sensor data that are electrical infrastructure 110 and/or vegetation. In some embodiments, the recognition module 224 may use object detection and recognition technology to detect and recognize instance of specific semantic objects of a certain class in the sensor data. The object detection and recognition technology may be any form data processing such as image processing. Furthermore, the recognition module 224 may use machine learning or deep learning to identify the electrical infrastructure 110 and/or the vegetation.

In this manner the recognition module 224 can isolate a set of sensor data that includes both electrical infrastructure 110 and the vegetation. For example, the recognition module 224 may identify a set of sensor data that includes both the first tree 112 and the electrical infrastructure 110 and/or the second tree 114 and the electrical infrastructure 110. Accordingly, the recognition module 224 may isolate a set of sensor data that is one or more frames of the series of frames that includes both the electrical infrastructure 110 and the vegetation. Thus, the set of sensor data may identify potential twining events when the vegetation is twined with the electrical infrastructure 110.

The recognition module 224 may also identify a vegetation type of the vegetation based on the set of sensor data. The vegetation type may include classes based on size, shape, growth pattern, species, etc. In one embodiment, the recognition module 224 may use object detection and recognition technology to identify a vegetation type for the vegetation based on the height, width, leaves, branch structure, fruit, location, etc. of the vegetation. For example, the recognition module 224 may classify the first tree 112 as a maple tree and/or the second tree 114 as an oak tree based on the leaves of the first tree 112 and the second tree 114.

The recognition module 224 may also identify an infrastructure type of the electrical infrastructure 110 based on the set of sensor data. In one embodiment, the recognition module 224 may use object detection and recognition technology to identify the infrastructure type for the electrical infrastructure 110 based on the size, shape, energy signature, location, infrastructure mapping, etc. For example, the recognition module 224 may classify the electrical infrastructure 110 as overhead powerlines based on the shape and location of the electrical infrastructure 110.

At block 304 the method 300 includes the position module 226 associating a location with the set of sensor data. The location may be a geo-location associated with a potential twining event. The location may be based on geo-locational coordinates (e.g., global positioning system (GPS) coordinates, differential global positioning system (DGPS) coordinates, street address, mile marker number, directions, etc.). The location may be determined by the position determination unit 218 of the vehicle computing device 206, the vehicle systems 208, the vehicle sensors 210, and/or the remote server 202.

In one or more embodiments, the position module 226 may determine a location with the set of sensor data. The location may be based on the location of the vehicle when the sensor data was acquired. For example, suppose the first vehicle 106 receives the set of the sensor data, the optical sensor 244 may include location data in the metadata of the sensor data. The position module 226 may associate the location of the set of sensor data based on the location data of the metadata.

The position determination unit 218 may associate a location with the set of sensor data based on GPS coordinates of the first vehicle 106 when the set of sensor data was received by the recognition module 224. The position module 226 may also revive the location from a portable device (not shown) or the remote server 202. In one embodiment, the position module 226 may use map data accessed by the position module 226 to determine one or more travel routes (e.g., roads, streets, highways, etc.) to determine a location with the set of sensor data.

The position module 226 may also identify a weather event based on the weather data. The weather data may be received from the remote server 202. A weather event may be any atmospheric condition associated with the location that may impact the vehicle, driving the vehicle, and/or safety of a vehicle occupant, the electrical infrastructure 110, and/or the vegetation such as the first tree 112 and the second tree 114. For example, a weather event can be precipitation (e.g., light rain, steady rain, thunderstorm, snow, hail, sleet, blizzard, etc.), hurricane, high winds, fog, wildfire, sandstorm, tornadoes, and avalanche, among others.

In one embodiment, the position module 226 may identify a weather event associated with the location. The position module 226 may query and/or receive weather data from a third party such as a weather tracking agency, government agency, and news outlet, among others. In another embodiment, the position module 226 may identify a weather event based on image processing of the sensor data or weather data. The weather data may be a series of weather map images associated with the location. The weather map images are processed based on pixel data, such as the color values of the pixels or the pixel color. For example, the pixel data may be used to identify the color value of each pixel in the weather map images. A weather event is identified based on the color value of the pixels. The weather map images may be color coded such that different weather events are prescribed different colors. For example, pixels having a specific color value or a range of color values may be identified as representing a weather event. Accordingly, pixels can be grouped based on pixel color value, and the group of pixels is identified as a weather event.

At block 306 the method 300 includes the twining module 228 identifying a twining event of the vegetation and the electrical infrastructure 110 based on a proximity threshold of the electrical infrastructure 110 and the vegetation. The proximity threshold defines a minimum nearness between the electrical infrastructure 110 and the vegetation. For example, vegetation may begin to pose a threat to between the electrical infrastructure 110 at a distance of one foot due to electric arching or sparking. Therefore, the proximity threshold may be a foot. In some embodiments, the proximity threshold may be variable based on a number of factors. For example, in the proximity threshold may be larger in a dry season when forest fires are more likely and shorter in the rainy season.

The proximity threshold may also be based on the type of vegetation native to the area. For example, in an area prone to fast growing creeping vines, such as kudzu, the proximity threshold may be larger due to the short amount of time in which the fast-growing creeping vines can overwhelm the electrical infrastructure 110. In another embodiment, the proximity threshold may be based on the type of electrical infrastructure 110. For example, electrical infrastructure 110 that carries high amperage current, such as a fatal current, may have a larger proximity threshold.

The twining module 228 compares the proximity threshold to the encroachment distance between the vegetation and the electrical infrastructure 110 to identify a twining event. The encroachment distance measures the distance between the vegetation and the electrical infrastructure. For example, the first encroachment distance 116 is measured from the first tree 112 to the electrical infrastructure 110. The first encroachment distance 116 may be measured by the recognition module 224 or the twining module 228 based on the sensor data.

In some embodiments, the encroachment distance is defined as the closest distance between the vegetation and the electrical infrastructure 110. For example, the encroachment distance may be measured from the point of the vegetation closest to the electrical infrastructure 110. In some embodiments the recognition module 224 or the twining module 228 may solve a closest pair of points problem or other computational geometry to calculate the encroachment distance.

When there is no distance between the vegetation the electrical infrastructure 110 the encroachment distance may be identified by the recognition module 224 or the twining module 228 as a null encroachment distance. For example, a null encroachment distance may be the result when the vegetation overlaps or is wrapped around the electrical infrastructure 110. For example, suppose that the second tree 114 of the vegetation has grown above and around a lower line of the electrical infrastructure 110. When the encroachment distance is calculated, it may appear to be a negative value accordingly, the result is the null encroachment distance.

As discussed above, the twining module 228 may compare the encroachment distance to the proximity threshold to the proximity threshold to identify the twining event. A twining event is identified when the encroachment distance satisfies the proximity threshold such that the vegetation and electrical infrastructure 110 are closer than prescribed by the proximity threshold. Suppose the proximity threshold is set as the null encroachment distance. The first encroachment distance 116 is compared to the proximity threshold, the first encroachment distance 116 is greater than the null encroachment distance. Accordingly, the twining module 228 would not identify a twining event based on the first encroachment distance 116 between the first tree 112 and the electrical infrastructure 110 with the proximity threshold. Conversely, the null encroachment distance between the second tree 114 and the electrical infrastructure 110 would satisfy the example proximity threshold set to the null encroachment distance. Accordingly, the twining module 228 would identify a twining event based on the null encroachment distance between the second tree 114 and the electrical infrastructure 110 with the proximity threshold.

At block 308 the method 300 includes a report module 230 generating a report including the twining event and the location. Therefore, the report identifies a twining event and indicates where the twining event occurred so that the twining event can be remedied. The report may include that the electrical infrastructure 110 includes poles and overhead powerlines, the first tree 112 is a maple tree, the second tree 114 is an oak tree, the first encroachment distance 116 and/or the null encroachment distance.

Additionally, the information used to classify the vegetation and/or the electrical infrastructure 110 may be included in the report. For example, the report may include the height, width, leaves, branch structure, fruit, location, etc. of the vegetation and/or the size, shape, energy signature, location, infrastructure mapping, etc. of the electrical infrastructure 110. The report may also include calculated values such as the encroachment distances and the proximity threshold. In some embodiments, the proximity threshold may be included as a range based on the variance of the proximity threshold.

By providing additional information, the report may provide valuable timeline information. For example, the growth time and/or lifetime for the type of vegetation and the encroachment distance may be used to calculate the amount of time until null encroachment. Therefore, the report may include timeline information that may indicate when the vegetation makes contact with the electrical infrastructure 110 so that an entity wishing to remedy the electrical infrastructure 110 and vegetation twining can schedule an activity such as trimming, pruning, electrical outages, tools, heavy equipment (e.g., a mobile hydraulic crane, dump truck, bucket trucks, etc.). Accordingly, the report may include any information that can facilitate avoiding or remedying the electrical infrastructure 110 and vegetation twining.

As discussed above, any number of vehicles may be capturing sensor data that used by the systems and methods described herein to identify twining events. For example, the recognition module 224 may receive sensor data from both the first vehicle 106 and the second vehicle 108 to identify a twining event. The report module may use sensor data from multiple vehicles to confirm the initial identification of the twining event. For example, the report module 230 may generate a report in response to a predetermined number of twining events associated with the location being identified from the sensor data of a plurality of vehicles. For example, suppose that a twining event is identified from the sensor data captured by the first vehicle 106. The report module 230 may delay generating a report until a twining event is identified for that location based on different sensor data, such as sensor data captured by the second vehicle 108.

The report may then be sent to an interested entity wishing to, for example, schedule the activity to facilitate avoiding or remedying the twining event. For example, the report module 230 may transmit the report to interested entities such as utility companies, governments, property owners, etc. In some embodiments, the report may also include information based on the interested entity. For example, the report may include an optimal route for reaching the location associated with the twining event from an origin associated with interested entity, such as headquarters, vehicle depot, or field office, among others. In this manner, the report may be specifically tailored to an interested entity. In another embodiment, the report module may send the interested parties a notification when a report has been generated. Accordingly, an interest entity may be alerted when new information regarding a twining event is available. The new info may be a twining event being identified for the location based on sensor data from a different vehicle, such as the second vehicle 108.

Figure 4:
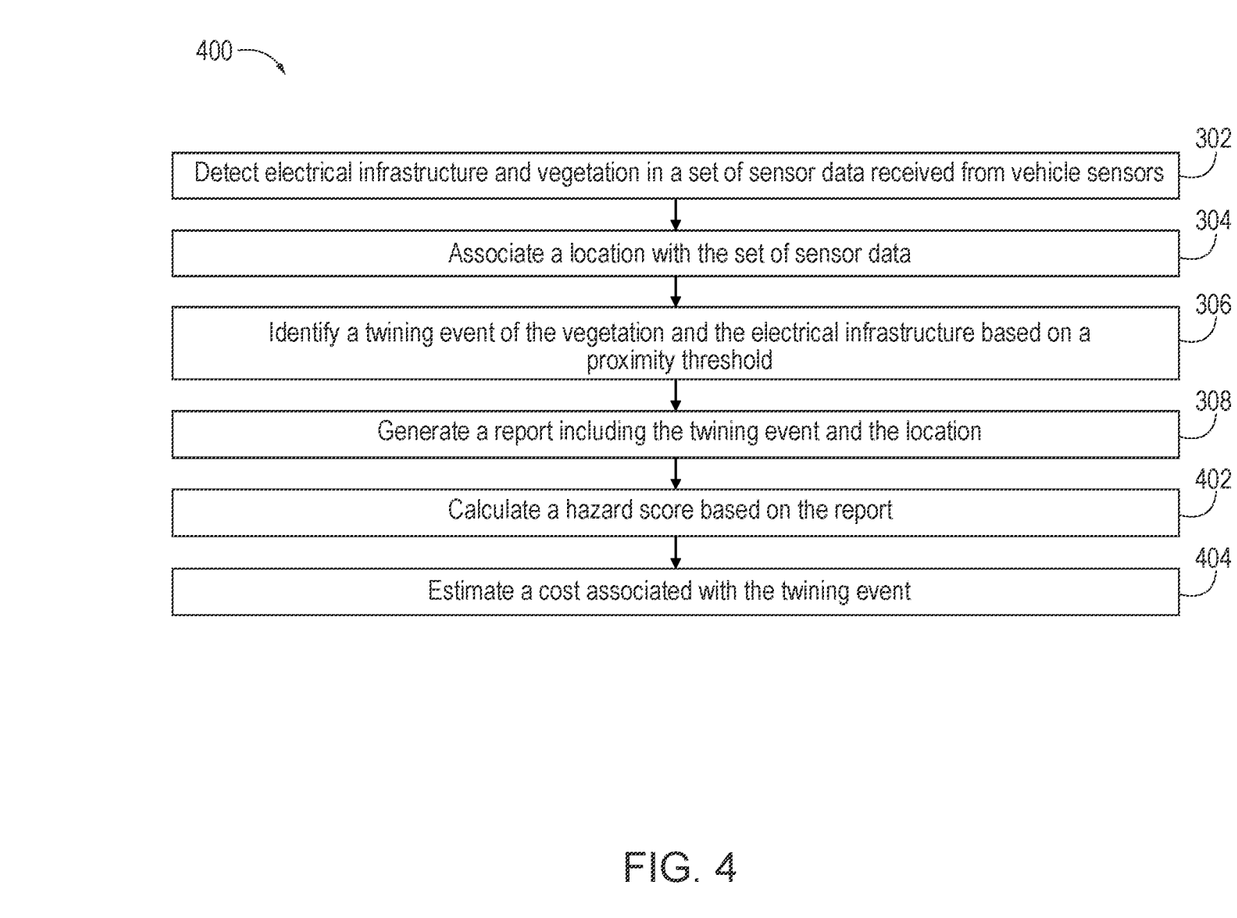
FIG. 4 is a process flow for reporting electrical infrastructure and vegetation twining according to one embodiment.

Referring now to FIG. 4, a method 400 for estimating a cost associated with a reported electrical infrastructure 110 and a vegetation is provided according to an exemplary embodiment. FIG. 4 will be described with reference to FIGS. 1-3. As shown in FIG. 4, the method 400 can be described by a number of steps. For simplicity, the method 400 will be described by these steps, but it is understood that the steps of the method 400 can be organized into different architectures, blocks, stages, and/or processes.

In particular, the method 400 includes block 302, block 304, block 306, and block 308 that operate in a similar manner as described above with respect to the method 300 of FIG. 3 as discussed above. Additionally, the method 400 includes, at block 402, the estimation module 232 calculating a hazard score based on the report. The hazard score may be calculated based on information from the report such as the timeline information. The timeline information may indicate that the contact between the vegetation and the electrical infrastructure 110 is imminent. Accordingly, the hazard score may be calculated to be higher. The hazard score may also be based on the weather event identified by the recognition module 224 or a climate associated with the location of the twining event determined by the position module 226.

The hazard score may also be based on the type of vegetation or the type of electrical infrastructure 110. For example, suppose that the electrical infrastructure 110 carries a fatal current. The estimation module 232 may calculate a higher hazard score. Therefore, in addition to the timeline information, the hazard score may be based on the inherent danger of the objects involved in the twining event, such as the electrical infrastructure 110. The hazard score may also be based on the location of the twining event. For example, the hazard score may be higher for a densely populated area and lower for a less densely populated area. Likewise, the hazard score may be calculated based on the type of the roadway 100. For example, roadways with a higher throughput may result in a higher hazard score.

At block 404 the method 400 includes the estimation module 232 estimating a cost associated with the twining event. The cost may also be based on any information in the report. As discussed above, the report may include the growth time for the type of vegetation and the encroachment distance, which may be used to calculate the amount of time until null encroachment. Using the timeline information, the cost may be calculated based on whether an emergency team would be dispatched or whether trimming could be scheduled in the normal course of business. The estimation module 232 may also calculate the cost based on the activity such as trimming, pruning, electrical outages, tools, heavy equipment (e.g., a mobile hydraulic crane, dump truck, bucket trucks, etc.) and human resources, among others to facilitate avoiding or remedying the twining event. The cost may also be estimated as a function of time. For example, the cost may be initially estimated to be low but increase over time.

In some embodiments, the cost may also be correlated with the hazard score. For example, suppose the hazard score is based on a prevalence of forest fires associated with the location. The estimation module 232 may increase the cost in a manner that takes into account coping with hazards. Accordingly, an interested entity can adequately plan, prepare for, and deal with twining event reported in the generated report. In this manner, the systems and methods described herein report twining events between vegetation and the electrical infrastructure 110 for interested entities.

Figure 5:
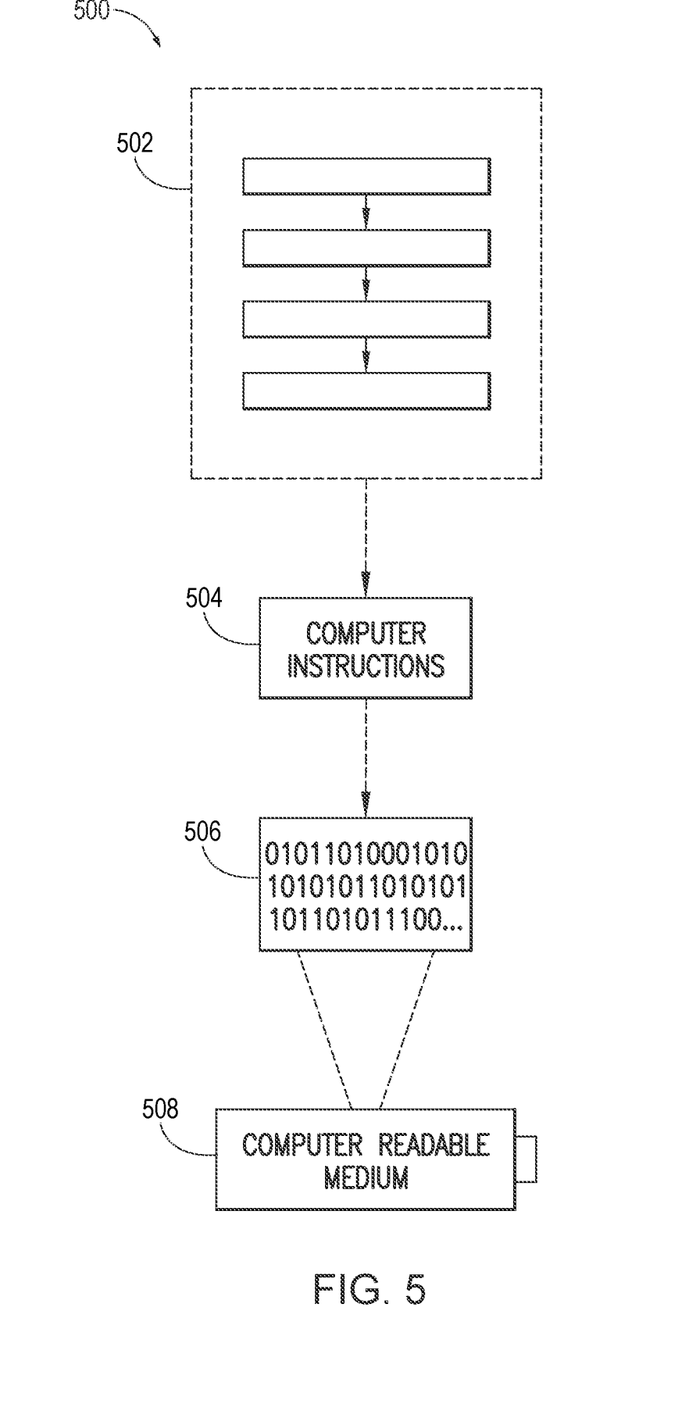
FIG. 5 is an illustration of an example computer-readable medium or computer-readable device including processor-executable instructions configured to embody one or more of the provisions set forth herein, according to one aspect.

Still another aspect of the systems and methods for reporting a twining event of vegetation and electrical infrastructure 110 involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 300 of FIG. 3 and the method 400 of FIG. 4. In another aspect, the processor-executable computer instructions 504 may be configured to implement a system, such as the operating environment of FIG. 2. Many such computer-readable media may be devised by those of ordinary skill in the art that are configured to operate in accordance with the techniques presented herein.

The term "computer readable media" as used herein includes computer storage media. Computer storage media includes volatile and nonvolatile, removable and non-removable media implemented in any method or technology for storage of information such as computer readable instructions or other data. Memory 214 and data store 216 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the VCD 206.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for reporting electrical infrastructure and vegetation twining, the system comprising:
a processor; and
a memory storing instructions that when executed by the processor cause the processor to:
detect the electrical infrastructure and the vegetation in a set of sensor data received from vehicle sensors;
associate a location with the set of sensor data;
identify a twining event of the vegetation and the electrical infrastructure based on a proximity threshold of the electrical infrastructure and the vegetation; and
generate a report including the twining event and the location.

2. The system for reporting the electrical infrastructure and the vegetation twining of claim 1, wherein the sensor data includes a series of frames received from an optical sensor of the vehicle sensors, and wherein the set of sensor data is a frame of the series of frames.

3. The system for reporting the electrical infrastructure and the vegetation twining of claim 1, wherein the instructions, when executed by the processor, further cause the processor to identify a vegetation type of the vegetation, and wherein the report includes the vegetation type.

4. The system for reporting the electrical infrastructure and the vegetation twining of claim 1, wherein the instructions, when executed by the processor, further cause the processor to identify an infrastructure type of the electrical infrastructure, and wherein the report includes the infrastructure type.

5. The system for reporting the electrical infrastructure and the vegetation twining of claim 1, wherein the instructions, when executed by the processor, further cause the processor to identify a weather event associated with the location and wherein the report includes the weather event.

6. The system for reporting the electrical infrastructure and the vegetation twining of claim 1, wherein the instructions, when executed by the processor, further cause the processor to estimate a cost associated with the twining event.

7. The system for reporting the electrical infrastructure and the vegetation twining of claim 6, wherein the instructions, when executed by the processor, further cause the processor to calculate a hazard score based on the report.

8. The system for reporting the electrical infrastructure and the vegetation twining of claim 1, wherein the electrical infrastructure is an overhead powerline.

9. A method for reporting electrical infrastructure and vegetation twining, the method comprising:
   detecting the electrical infrastructure and the vegetation in a set of sensor data received from vehicle sensors of a vehicle;
   associating a location with the set of sensor data;
   identifying a twining event of the vegetation and the electrical infrastructure based on a proximity threshold of the electrical infrastructure and the vegetation; and
   generating a report including the twining event and the location.

10. The method for reporting the electrical infrastructure and the vegetation twining of claim 9, wherein the location is based on global positioning system coordinates of the vehicle when the set of sensor data was received by the vehicle sensors.

11. The method for reporting the electrical infrastructure and the vegetation twining of claim 9, wherein the sensor data includes a series of frames received from an optical sensor of the vehicle sensors, and wherein the set of sensor data is a frame of the series of frames.

12. The method for reporting the electrical infrastructure and the vegetation twining of claim 9, further comprising:
   identifying a weather event associated with the location and wherein the report includes the weather event.

13. The method for reporting the electrical infrastructure and the vegetation twining of claim 9, further comprising estimating a cost associated with the twining event.

14. The method for reporting the electrical infrastructure and the vegetation twining of claim 9, further comprising calculating a hazard score based on the report.

15. The method for reporting the electrical infrastructure and the vegetation twining of claim 9, wherein the report is generated in response to a predetermined number of twining events associated with the location being identified based on the sensor data from a plurality of vehicles.

16. The method for reporting the electrical infrastructure and the vegetation twining of claim 15, wherein vehicles of the plurality of vehicles are consumer operated.

17. A non-transitory computer readable storage medium storing instructions that when executed by a computer, which includes a processor to perform a method for reporting electrical infrastructure and vegetation twining, the method comprising:
   detecting the electrical infrastructure and the vegetation in a set of sensor data received from vehicle sensors of a vehicle;
   associating a location with the set of sensor data;
   identifying a twining event of the vegetation and the electrical infrastructure based on a proximity threshold of the electrical infrastructure and the vegetation; and
   generating a report including the twining event and the location.

18. The non-transitory computer readable storage medium of claim 17, wherein the location is based on global positioning system coordinates of the vehicle when the set of sensor data was received by the vehicle sensors.

19. The non-transitory computer readable storage medium of claim 17, further comprising estimating a cost associated with the twining event.

20. The non-transitory computer readable storage medium of claim 19, further comprising receiving twining events from a plurality of vehicles, and wherein the report is generated in response to a predetermined number of twining events being associated with the location.

* * * * *